Patented Dec. 4, 1945

2,390,189

UNITED STATES PATENT OFFICE 2,390,189

MASTIC COMPOSITION

Frank J. Soday, Swarthmore, Pa., assignor to The United Gas Improvement Company, a corporation of Pennsylvania No Drawing. Application November 1, 1941, Serial No. 417,575

4 Claims. (Cl. 260—41)

This invention pertains to the use of certain hydrocarbon resins in mastic and floor tile compositions.

More particularly, this invention relates to the use in mastic tile compositions of resins derived by the polymerization, by thermal and/or catalytic methods, of the high boiling monomeric hydrocarbon material separated in monomeric form, from tar formed during the production of combustible gas by processes involving the pyrolytic decomposition of petroleum oil with or without the aid of catalysts.

A feature of the invention is the provision of mastic and floor tile compositions employing a resin of the kind described as a binder for other ingredients, for example, as a binder for fibrous material. Fillers may be also incorporated in the compositions, such for example as finely divided inorganic material. Coloring agents may also be employed such for example as pigments and/or dyes. Modifying agents may also be employed, such for example as plasticizers, softeners, waxes, rubber, vegetable oils, raw and/or bodied drying oils, cellulose ethers and/or esters, solvents and other resinous materials.

Mastic and floor tile are customarily prepared by incorporating binders such as natural or artificial asphalt, Gilsonite, or still bottoms or residues with a fibrous material and a filler, either with or without the addition of one or more modifying agents such as, for example, pigments and softening agents. Mastic and floor tile prepared from such binders have found limited application in certain fields, but their general acceptance has been retarded by certain defects in the binders used in their preparation.

I have found that the field of utilization of mastic and floor tile of this type can be very largely increased by the use as a binder in such compositions, of a resin derived by the polymerization, by thermal and/or catalytic methods, of the high boiling monomeric hydrocarbon material separated in monomeric form from tar formed during the production of combustible gas by processes involving the pyrolytic decomposition of petroleum oil with or without the aid of catalysts.

The improvement in the properties of mastic and floor tile by the use of resins of the type described herein as binders in place of those used heretofore for this purpose is directly traceable to certain outstanding physical properties possessed by these resins.

Resins of the type herein described may be produced with uniformity of quality by the controlled polymerization of unsaturated hydrocarbon fractions which may be closely controlled as to composition. At the same time by suitably selected variations in the polymerization procedure, resins possessing a wide range of physical properties may be reproducibly manufactured. Thus, for example, resins having melting points ranging from room temperature to 200° C., or higher, may be produced readily. This is of very considerable practical importance as it enables one to prepare mastic or floor tile having a wide variety of properties from the same type of resinous material.

As these resins are substantially completely hydrocarbon in nature, and are substantially free from polar groups, mastic and floor tile prepared by their use are unusually stable and inert in nature, and are highly resistant to decomposition and deterioration in any way. In addition, these resins are derived from a distilled or extracted raw material, consequently they are free from dirt and other foreign material.

By a suitable control of the polymerizing process, and the method of isolating the unsaturated hydrocarbon material prior to polymerization, resins of the type described herein may be obtained readily in colors ranging from light yellow to dark brown. The use of such resins in the preparation of mastic and floor tile permits the production of light colored products, which is of considerable practical importance.

Resins of the type described herein also are more completely compatible with certain of the ingredients in mastic and floor tile compositions, such as, for example, drying oils, than certain of the resins used heretofore for this purpose, consequently a wider range of formulations may be employed.

Probably the outstanding characteristics of these resins is their wetting and dispersing properties. This is of the utmost value in the preparation of mastic and floor tile, as it results in a very considerable saving in the time and mechanical energy required to prepare such compositions.

The method of preparing these resins will be discussed in some detail in order to emphasize certain of their desirable properties.

Resins of the type described herein also possess excellent alkali resistance consequently their use in mastic and floor tile formulations results in the production of materials having excellent alkali resistance. As floor coverings are commonly washed with alkaline solutions, the alkali-resisting properties of these resins are of very great importance.

I have found that the resin obtained by the thermal and/or catalytic polymerization of the unsaturated monomeric material boiling within the range of from 210° to 350° C. and separated in monomeric form from higher boiling pitch constituents of the tar formed during the production of gas by processes involving the pyrolytic decomposition of petroleum oil, with or without the aid of catalysts, is unusually well adapted for employment as a binder in mastic and floor tile compositions, producing compositions of exceptionally good properties.

The hydrocarbon constituents of such petroleum tar have usually been considered to comprise residual tar, dead oil, and light oil. The residual tar comprises the heavy black pitch constituents of the tar together with any oil unseparated therefrom. The dead oil comprises oil separated from the residual tar and boiling higher than say 200-210° C. The light oil comprises oil separated from residual tar and boiling lower than say 200-210° C.

It has been discovered that very considerable quantities of such resin-forming unsaturated monomeric material above referred to, including large quantities of readily heat polymerizable material, may be contained in the tar produced in the vapor phase pyrolysis of crude petroleum oil or a fraction or fractions thereof such as for example, gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and also particularly so when the oil pyrolyzed is naphthenic, such as a crude oil classifiable in classes 5 to 7 inclusive, according to the method of classification described in Bureau of Mines Bulletin 291 as modified by Bureau of Mines Report of Investigations 3279, or a fraction or fractions of such an oil.

The possibility of recovering large quantities of resin forming monomeric unsaturated material boiling in the dead oil range was long unrealized. This was because the usual distillation procedures for the purpose of petroleum tar dehydration and/or tar fractionation were such as to polymerize the readily heat polymerizable monomers boiling in the dead oil range into heavy polymers, which were inextricably mixed with the heavy black residual pitch constituents and lost therein.

In copending application Serial Number 370,608, filed December 18, 1940, by Edwin L. Hall and Howard R. Batchelder, such heat polymerizable monomeric hydrocarbons boiling in the range of from 210 to 350° C. and separated from the heavy black pitch constituents of the petroleum tar are described and claimed together with heat polymers produced therefrom.

In copending application Serial Number 386,232, filed April 1, 1941, by Waldo C. Ault, there is described and claimed the production of catalytic resins from the heat polymerizable and/or catalytically polymerizable monomeric hydrocarbons boiling within the range of from 210° C. to 350° C. and separated in monomeric form from the heavy black pitch constituents of the petroleum tar.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, there is described a method of dehydrating such petroleum tar emulsions and of fractionating the hydrocarbon constituents thereof by rapid distillation with the separation from the heavy pitch constituents of residual tar of such heat polymerizable unsaturated monomeric hydrocarbons boiling in the dead oil range.

In copending application 353,034, filed August 17, 1940, by Howard R. Batchelder, there is described the dehydration of such petroleum tar emulsions and the fractionation of the hydrocarbon constituents thereof with the recovery of monomeric unsaturated heat polymerizable dead oil constituents separate from the heavy black pitch constituents of residual tar, by the solvent extraction of the emulsion with a hydrocarbon solvent such as liquefied propane or butane.

Other processes, for example fractional condensation, might be employed to recover these relatively high boiling unsaturated hydrocarbons in monomeric form and separate from the heavy black pitch constituents of the tar. Also processes for oil pyrolysis which avoid the formation of emulsions, may be employed for the production of the monomeric material. Furthermore, while it may be preferred to employ petroleum oils or cuts therefrom, which are classifiable in classes 5 to 7 inclusive according to Bureau of Mines Bulletin 291 as modified by Bureau of Mines Report of Investigations 3279, and particularly in class 7, other oils may be employed.

Whatever process of oil pyrolysis is employed in the production of this monomeric material and whatever process is employed for separating the resultant tar a very important factor is the exercise of care in the treatment of the tar in order to avoid excessive polymerization of these readily heat polymerizable dead oil constituents and their loss as polymers mixed with the heavy black pitch constituents of the residual tar.

As a result of separation of the light oil and dead oil components of the products of such petroleum oil pyrolysis from the residual tar, without polymerization or with materially reduced polymerization, a substantially pitch-free hydrocarbon material may be separated having a portion boiling within the range of from 210 to 350° C., which may contain from 5% to 30%, and higher, of monomeric unsaturated hydrocarbons readily polymerizable by heat.

The particular concentration of this heat polymerizable monomeric material obtained in a given case will depend upon the amount of polymerization produced in separating it from the residual tar, as well as upon such factors as the conditions of pyrolysis and the character of the petroleum oil pyrolyzed.

As previously stated, the above mentioned heat polymerizable monomeric material may be readily polymerized by heat to form valuable resins.

Polymerization may be effected by heating the total material separated from the residual tar sufficiently to polymerize the readily heat polymerizable monomers boiling within the range of from 210° to 350° C., but insufficiently to appreciably polymerize the heat polymerizable material contained in lower boiling ranges, such, for instance, as methyl styrenes and styrene. This may be accomplished, for example, by heating with stirring for 4 hours at 200° C., followed by distillation under vacuum to isolate the resin.

It may be preferable, however, to first effect a separation by fractional distillation between light oil boiling below say 210° C. and dead oil boiling above say 210° C.

The heat polymerizable monomeric material boiling within the range of 210° to 350° C. is so readily polymerizable by heat, that, in the fractional distillation of the light oil from the dead oil, a portion of the monomeric material is usually unavoidably polymerized and remains as polymer dissolved in the other constituents of the dead oil after the light oil is taken off overhead.

The polymerization of the heat polymerizable unsaturated monomeric material in the separated dead oil may be effected by heating the dead oil with stirring, for example, for four hours at 200° C.

The resin thus produced, together with any resin produced during the separation of the light oil from the dead oil, may then be isolated by distillation under vacuum.

In the separation of lower boiling hydrocarbon material from the pitch constituents of residual tar by various methods, the oil separated may contain components boiling above 350° C, and there may be present heat polymerizable monomeric material boiling outside the range of from 210° to 350° C. together with the monomeric material boiling within that range. On polymerization therefore the resin may include polymers derived from monomers boiling outside said range along with polymers derived from monomers boiling within said range.

As hereinbefore stated, after polymerization the resin may be isolated by distillation in vacuum, which may be assisted by steam. The yield, melting point, and other characteristics of the resin will depend upon the extent to which the isolation has been carried, or, in other words, upon the proportion of associated oils left in the resin.

Exhaustive steam distillations of the resins obtained from the unsaturated monomeric material isolated from tar by the distillation or solvent extraction methods described herein have produced resins having melting points as high as from 185° C. to 200° C. and higher, cube in mercury, as determined by the method and apparatus described in A. S. T. M., Procedure D61-24, with the following modifications.

1. Mercury is employed in depth of 2½ inches instead of water.
2. The cube of resin is rigidly supported by clamping the hook upon which the resin is attached so that the top of the cube is 1 inch below the surface of the mercury.
3. A 1½ inch immersion thermometer is employed and is immersed to that depth.
4. The exact temperature at which the resin becomes visible at the surface of the mercury is recorded as the softening point of the resin.
5. The melting point of the resin is calculated from the softening point by the following formula.

Melting point °C.=softening point °C.×1.25+2° C.

The melting point of the resins described in this specification and as used in the claims is intended to mean melting point as determined by the above recited method, or by equivalent methods.

Lower melting point resins may be readily obtained in greater yields by less exhaustive removal of the associated oils, thus resins ranging from very soft to hard resins having high melting points may be obtained as desired.

It has been usually found that each 6% of associated oils left in the resin lowers the melting point about 10° C.

Heat resins having melting points of 120° C. have been readily produced in yields corresponding to 20 to 30% of the dead oil in the case of the tar distillate produced in accordance with the process described in copending application Serial No. 342,735 and resins of the same melting point have been obtained in yields as high as 60% of the dead oil in the case of dead oil separated from extract produced in the process described in application Serial No. 353,034.

The heat polymerizable unsaturated monomeric material is preferably in sufficient concentration in that portion of the hydrocarbon material separated from the residual tar which boils within the range of from 210° to 350° C. to produce on polymerization by heat a 120° C. melting-point resin in quantity equal to at least 10 percent of the hydrocarbon material boiling within the range from 210° C. to 350° C., and preferably at least 20 percent, or higher, but lower concentrations may be employed.

The color of the resins obtained may vary from yellow to dark brown.

Heat polymer resins produced from dead oil separated from residual tar by the distillation process described in said copending application, Serial No. 342,735, have shown a tendency to be lighter in color than those produced from dead oil obtained from the solvent extraction of tar with propane and butane as described in said copending application, Serial No. 353,034. Also, heat polymer resins produced from the lower boiling portions of the dead oil have shown a tendency to be lighter in color than heat polymer resins produced from the higher boiling portions, especially such a portion as that boiling in a dead oil cut taken from 180° C. to 210° C. under a vacuum equivalent to 20 mm. of mercury, absolute.

The following examples will serve to illustrate the preparation of resins from such unsaturated fractions by thermal polymerization methods.

*Example 1*

Approximately 1000 grams of dead oil derived from the rapid distillation of oil gas tar in accordance with the process described in said copending application, Serial No. 342,735, and subsequent separation of the distillate, was weighed into a 2-liter 3-necked flask equipped with a thermometer and a short reflux condenser. The oil was then slowly stirred and heated over a Bunsen burner at a liquid temperature of 200° C. (± 10° C.) for a period of 4 hours.

At the conclusion of this period, the material was allowed to cool somewhat and was then transferred for distillation to a tarred 2-liter flask equipped with a ground glass neck.

The oil was accurately weighed at this point.

The flask was provided with means for measuring vapor temperatures and was connected with condensing apparatus and with means for providing a vacuum, including a pressure control device. Bumping during distillation was avoided by folding several folds of iron wire to such length that one end reached slightly into the neck of the flask while the other end rested on the bottom of the flask.

The pressure was reduced to 100 mm. Hg, absolute, and heat applied by means of a Bunsen burner. The distillation was continued at a pressure of 100 mm. Hg, absolute, until the vapor temperature reached 180° C. During this first stage of the distillation, care should be exercised to prevent crystallization of naphthalene, if present, such as by employing a condenser operating at elevated temperatures.

When the vapor temperature reached 180° C. at a pressure of 100 mm. Hg, absolute, the flame was lowered and the pressure gradually reduced to 20 mm. Hg, absolute, using care to avoid bumping. When a pressure equivalent to 20 mm. Hg, absolute, was reached, the pressure was maintained at that value, and the distillation continued until a vapor temperature of 195° C. was reached.

During the second stage, the condenser may be cooled by cold water, but care should be taken to avoid the solidification of anthracene, if present.

The distillation was conducted rapidly, 5 to 10 cc. of oil per minute being removed.

When a vapor temperature of 195° C. was reached, the source of heat was removed and air was permitted to enter the apparatus slowly until atmospheric balance was restored.

In the above operation the yield of resin was 29.3%, with an actual melting point of 128° C., which was calculated to be equivalent to a yield of 31.4% at a melting point of 120° C. The color of the resin was light brown.

A straight run A. S. T. M. distillation of 100 cc. of the original oil gave the following data:

| | | |
|---|---|---|
| First drop | ° C | 194 |
| 5 cc | ° C | 212 |
| 10 cc | ° C | 223 |
| 20 cc | ° C | 234.5 |
| 30 cc | ° C | 242.5 |
| 50 cc | ° C | 256.5 |
| 70 cc | ° C | 283.0 |
| 90 cc | ° C | 319.0 |
| Decomposition point | ° C | 319.0 |
| Total distillate | cc | 87 |
| Density at 20° C | | 1.0107 |

As pointed out previously, the high boiling monomeric material derived from tar obtained in the pyrolysis of petroleum, by rapid distillation or solvent extraction methods may be polymerized to form resins of the type desired by the application of certain catalysts, either with or without the simultaneous, or otherwise, application of heat.

Catalysts such as mineral acids, for example, sulfuric acid, hydrogen chloride, acids of phosphorus, or acid acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron tri-fluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid acting metallic halides.

Though acid-acting catalysts are preferred, other catalysts may be employed if desired such, for example, as catalysts of the neutral surface type. Examples of such catalysts are activated clays, silica gel, activated carbon, and the like.

As an example of a convenient procedure for the production of resins of the type desired with the use of sulfuric acid as catalyst, the following is given.

Example 2

A sample of the oil to be polymerized, say 500 cc., is poured into a two-liter 3-neck flask equipped with a thermometer and stirrer. To the oil is added 96% $H_2SO_4$ while agitating vigorously. The acid is added 1 cc. at a time and the temperature is not permitted to exceed 50° C. The addition of the acid is continued in this manner until no further temperature rise is noted. The amount of acid necessary to achieve this end has been found to be about 1%, by volume, of the oil present.

The oil then is diluted with approximately an equal volume of naphtha, toluene, or similar diluent, and the solution decanted into 500 cc. of warm water (approximately 60° C.), leaving the acid sludge behind.

After settling, the water layer is drawn off, and neutralization of the acid is accomplished by use of a 10% to 20% aqueous solution of sodium hydroxide. After washing with caustic, an additional water wash may be made. In either case, the resin solution is dried by filtration through a bed of a suitable drying agent, such as lime.

If desired, the diluent may be added before polymerization instead of after polymerization.

After neutralization and drying, the resin may be isolated from the unpolymerized oil by any desired method, or the resin may be concentrated therein by vacuum distillation, which may be assisted by steam. The melting point of the resin and the yield obtained will depend, among other things, upon the extent to which the resin has been removed from the unpolymerized oil.

A convenient procedure for the production of resins of the type desired by the polymerization of monomeric unsaturated material, derived from tar resulting from the pyrolysis of petroleum, with the use of metallic halide catalysts or metallic halide-organic solvent complex catalysts is illustrated in the following examples.

Example 3

A 10 gram portion of the selected catalyst is suspended in 300 cc. of benzene by stirring. A 300 cc. portion of the dead oil separated from distillate recovered from petroleum tar emulsion by flash distillation as described in said copending application, Serial No. 342,735, is added dropwise from a separatory funnel while maintaining the temperature of the reaction mass below 50° C. When the addition has been completed, the mass is stirred for a period of 2 hours and then neutralized with an aqueous solution of sodium hydroxide (10 to 20%). Stirring is continued for an additional hour.

Clay or any other desired filter aid then is added and the mass is filtered. The aqueous layer is separated and discarded, after which the treated material is washed with hot water until the washings are neutral to litmus. The treated material then is filtered through lime to remove water or otherwise dried, and the resin isolated by any desired method.

The unsaturated dead oil employed in the following example was extracted from petroleum tar emulsion, along with light oil, following the procedure described in copending application Serial Number 353,034. After separation of the light oil, the unsaturated dead oil was treated in the following manner.

Example 4

A 532.6 gram portion of this unsaturated dead oil was treated with 8 cc. of 66° Bé. H₂SO₄ according to the procedure described in Example 2. Toluene was added after polymerization. Approximately 42% of the dead oil was converted to resin having a melting point of 97° C. and a brown color. The end temperature of the distillation for the removal of oil from the resin was 192° C. and the end pressure was equivalent to 18 mm. of mercury, absolute. A total of 145.9 grams of oil was recovered. The calculated yield of resin having a melting point of 120° C. was 36.2%.

As pointed out previously, the unsaturated dead oil employed for the preparation of resins of the type desired may be polymerized by (a) thermal means, (b) catalytic means, or (c) a combination of thermal and catalytic means. In the latter case, the processes may be carried out consecutively without the intermediate removal of resin, or the resin may be removed between successive treatments.

The unsaturated dead oil used in the following example was obtained from petroleum tar emulsion by the process of copending application Serial Number 342,735. After separation from light oil, it was treated to remove heat polymerizable unsaturates by heating at 200° C. for 4 hours, followed by removal of the heat polymer resin formed. It was then subjected to catalytic polymerization by the following method.

Example 5

A 500 gram portion of the said unsaturated dead oil was treated with 6 cc. of 66° Bé. H₂SO₄ according to the method described in Example 2. Naphtha was added after polymerization. Approximately 19% of the dead oil was converted to resin having a melting point of 88.2° C. and a light yellow brown color. The end temperature of the distillation for the removal of oil from the resin was 185° C., and the end pressure was equivalent to 20 mm. of mercury, absolute. A total of 407.9 grams of oil was recovered. The calculated yield of resin having a melting point of 120° C. was approximately 15%.

Examination of the monomeric unsaturated material and associated oil boiling within the range of from 210 to 350° C. described herein and the resins produced therefrom have shown that these materials are predominately aromatic.

Density determinations have indicated that the density at 25° C. of the resins obtained as above described frequently falls within the approximate range of 1.12 to 1.20, with resins produced from dead oil from the solvent extraction of tar tending to be somewhat higher than those produced from dead oil from rapid tar distillation. The densities of the acid polymers tend to be somewhat lower than those of the heat polymers derived from the same unsaturated dead oil. Resins of this type having other densities may be employed, however.

The molecular weights of the resins produced as previously described necessarily vary with the melting point, which also varies with the presence of varying quantities of associated oil among other factors. Determinations by the benzene freezing point depression method have shown that such resins usually have molecular weights ranging from 308 to 758 over a range of melting points from 80.5° C. to 195° C. as determined by the cube in mercury method.

The fracture of the high melting point resins described herein may range from conchoidal to hackly. In general, the polymers are quite brittle.

The resins described herein, except those hardened by exhaustive steam distillation to a very high melting point, will usually react positively to the anthraquinone reaction, indicating the presence of anthracene, unless produced from lower boiling portions of the dead oil, which do not contain anthracene, or unless the anthracene has been otherwise removed.

The resins described herein usually will give but a slight diazo reaction, indicating the substantial absence of phenols.

The resins produced as above described usually will give negative Lieberman Storch reactions, indicating the absence of rosin acids.

Upon thermal decomposition of the resins of the type produced as above described herein, appreciable yields of material boiling within the range from 210° C. to 350° C. will be produced.

The heat polymer resins of the type produced as above described usually are substantially completely soluble in carbon disulfide and benzol.

The quantity of resin insoluble in a mixture containing 50% petroleum ether and 50% pentane varies with the melting point of the resin, and may be of the order of 52% in the case of a thermal resin having a melting point of 95° C. and of the order of 80% in the case of a thermal resin having a melting point of approximately 183° C.

The quantity of resin of the type produced as above described insoluble in a mixture of 50% petroleum ether and 50% pentane, but soluble in CCl₄, may be of the order of 50% for a thermal resin having a melting point of 95° C. and of the order of 74% in the case of a thermal resin having a melting point of 185° C.

The quantity of thermal resin insoluble in both the petroleum ether-pentane solution and CCl₄ usually is very low, ranging from a fraction of a percent to the neighborhood of 6 or 7%.

In general, catalytic polymers are much more soluble than heat polymers from the same unsaturated dead oil in all solvents except the alcohols.

The polymers from unsaturated dead oils obtained from the rapid distillation process described in copending application, Serial No. 342,735, tend to be more soluble in those solvents tried than similarly produced polymers from unsaturated dead oils obtained by the solvent extraction process described in copending application, Serial No. 353,034.

The above described characteristics of color, density, fracture, melting point, molecular weight, diazo reaction, Lieberman Storch reaction, anthraquinone reaction, thermal decomposition, and solubility are given for the purpose of illustration. It is not intended to imply necessarily that the resin produced as described above and employed herein may not depart somewhat from this illustrative description in one particular or more.

Furthermore, the addition of other materials to the heat polymerizable monomeric unsaturated materials prior to polymerization or to the resins after polymerization may of course modify the properties of the resins produced. Examples of such materials are other synthetic or natural resins, plasticizers, softeners, fillers, coloring materials, etc.

The resin employed may comprise mixed polymers of monomeric material boiling throughout the range of from 210° C. to 350° C. together if desired with polymers of monomers boiling outside of this range or resins may employed which are produced from monomers boiling within a selected range or ranges within the range of from 210° C. to 350° C., for instance from separated material boiling above say 250° C. or say above 280° C.

In separating such material, the dead oil containing the monomers may be fractionated by distillation under vacuum assisted by steam to avoid undue polymerization during the separation, or other methods of separation may be employed.

As previously pointed out, the herein described resins, namely, those obtained by the thermal and/or catalytic polymerization of the unsaturated monomeric material recovered from the tar formed during the production of gas by processes involving the pyrolytic decomposition or conversion of hydrocarbon oil, with or without the aid of catalysts, are unusually well adapted for use as binders for mastic and floor tile.

Mastic and floor tile usually are prepared by incoporating a fibrous material and a filler, or a pigment and/or coloring agent, in a resinous binder, either with or without the use of certain modifying agents, such as, for example, plasticizers, softening agents, waxes, rubber, vegetable oils, drying oils, polymerized drying oils, cellulose ethers and esters, and solvents. Mastic and floor tile also may be prepared by simply incorporating a resinous binder in a fibrous material without the use of a filler, if desired.

The fibrous material most generally employed in mastic and floor tile compositions is asbestos, either alone or in combination with other fibrous materials. However, fibrous materials other than asbestos also may be employed for this purpose, either alone or in admixture. Examples of such fibrous materials are, for example inorganic fibrous material such as mineral wool, slag wool, rock wool, glass fibers, mica, and the like or organic fibrous material such as jute, cotton linters, wood fiber, etc.

The fillers and pigments employed in the preparation of mastic and floor tile usually are inorganic in nature although organic fillers and pigments may be employed. Fillers and pigments are commonly very finely divided. Examples of fillers and pigments are zinc oxide, carbon black, Prussian blue, lithophone, chrome yellow, iron oxide, lead chromate, titanium oxide, iron blue, and the like. In general, it may be said that fillers are added to mastic and floor tile to improve their wearing properties, particularly their resistance to abrasion and cold flow, while pigments are added to impart both color and improved mechanical properties to such compositions.

In addition to pigments, other inorganic and organic coloring agents may be added to the mastic and floor tile compositions.

Plasticizers and softening agents are added to mastic and floor tile primarily to reduce the brittleness of the compositions and to prevent or retard dusting. Examples of these agents are diethyl phthalate, dibutyl phthalate, diamyl phthalate, dibutyl tartrate, triphenyl phosphate, tricresyl phosphate, stearin pitch, corn oil foots, fish oil pitch, cottonseed pitch, and the like.

Other modifying agents which may be added to the mastic and floor tile compositions comprise waxes, such as montan wax, natural or synthetic rubber, or modifications thereof, vegetable oils, drying oils, such as, for example, tung oil, oiticica oil, Perilla oil, linseed oil, fish oil, soya bean oil, dehydrated castor oil, and the like, bodied and/or gelled drying oils, cellulosic derivatives particularly cellulose ethers or esters, such as, for example, benzyl cellulose, ethyl cellulose, nitrocellulose, and the like, and solvents.

The desired ingredients may be placed upon heated masticating rolls and milled until the fibrous material and the other ingredients are thoroughly incorporated in the resinous binder. As pointed out previously, it has been found that the use of a resin of the type described herein as a binder results in the production of mastic and floor tile having superior wear resistance, flexibility, durability, resiliency, and toughness. It is to be understood, of course, that other resins may be used in conjunction with the herein disclosed resin, if desired.

Other methods of incorporating the ingredients may, of course, be used. Thus, a mixture of the desired ingredients may be charged into a heated kneading machine, such as a Banbury or Pfleiderer mixer. Another method comprises thoroughly mixing the fibrous material with the other ingredients in a heater or mill, after which the resinous binder may be added and the process continued until the ingredients have been mixed thoroughly.

After the ingredients have been combined, the composition usually is passed through forming rolls which form it into a smooth sheet of the desired thickness. This sheet then may be cut into tile of the proper size and shape.

If desired, the mastic may be applied to a fibrous backing such as felt, paper, or textiles prior to, during, or after the sheeting and/or tile stamping operation, but preferably before the resinous binder has cooled sufficiently to lose its adhesive properties.

Moreover, the heated mastic composition also may be applied directly, to the surface to be covered, such as a floor or other area, although this procedure is somewhat less common than preparing tile from the mastic and applying it to the floor or other surface in this form.

An alternative method comprises incorporating a resin of the type described herein with fibrous and/or mineral fillers, and with or without plasticizing agents, pigments, colors, or other additives, followed by thinning the mixture by the use of suitable solvent, such as hydrocarbon solvents, and applying the material to the floor or other surface to be coated.

Resins of the type described herein having melting points ranging from, say, 60° C. to 190° C., or higher may be employed for the preparation of mastic and floor tile, the particular application to which the product is to be put determining, in large measure, the melting point of the resin to be employed.

For a large number of uses, however, I find that resins of the type disclosed herein having melting points in the range of 100 to 170° C., and more particularly 120 to 150° C., are especially desirable for use as binders for mastic and floor tile.

The invention may be more completely illustrated by means of the following examples.

*Example 6*

| | Parts by weight |
|---|---|
| Resin obtained as in Example 1 | 30 |
| Hydrocarbon plasticizing oil | 10 |
| Asbestos fiber | 80 |
| Carbon black | 6 |

Mix on hot rolls, sheet, and cut into tile of the desired size and shape.

Example 7

| | Parts by weight |
|---|---|
| Resin obtained as in Example 4 | 24 |
| Stearin pitch | 5 |
| Rosin | 3 |
| Asbestos fiber | 80 |
| Lithophone | 15 |
| Lead chromate | 1 |

Mix in a hot mill, sheet, and subdivide.

Example 8

| | Parts by weight |
|---|---|
| Resin obtained as in Example 4 | 15 |
| Ethyl cellulose | 5 |
| Asbestos | 40 |
| Triphenyl phosphate | 3 |
| Iron blue | 2 |
| Titanium oxide | 4 |

Mix on hot rolls, sheet, and subdivide.

Example 9

| | Parts by weight |
|---|---|
| Resin obtained as in Example 2 | 30 |
| Ethyl cellulose | 2 |
| Fish oil pitch | 20 |
| Asbestos fiber | 80 |
| Lead chromate | 3 |
| Lithophone | 10 |

Mix on hot rolls until thoroughly incorporated.

Example 10

| | Parts by weight |
|---|---|
| Resin obtained as in Example 3 | 18 |
| Polymerized drying oil | 6 |
| Asbestos fiber | 30 |
| Mineral filler | 30 |

Mix in a hot mill, sheet, and cut into tile.

It will be noted that the percentage of resin based on the fiber in the foregoing examples ranges from 30% as in Example 7 to 60% as in Example 10.

The resins used in the foregoing examples are obtained by the thermal and/or catalytic polymerization of the unsaturated materials obtained by the distillation, or solvent extraction, or both, of tar resulting from the pyrolysis of hydrocarbon materials at elevated temperatures, and may have any desired melting point.

It will be obvious that although especially adapted for use as floor coverings, the compositions of the present invention may find advantageous use in covering other surfaces as well.

In the specification and the claims, the term "mastic composition" is intended to mean a composition of the type described, whether sub-divided into tile or applied in continuous or semi-continuous form to a surface to be covered or otherwise, and whether used with or without a continuous or discontinuous fibrous backing.

While various procedures and formulas have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention, which is intended to be limited only as required by the prior art.

I claim:

1. A mastic composition comprising fibrous material, and from 30% to 60% based on said fibrous material of hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said hydrocarbon resin polymer having a melting point in excess of 60° C.

2. A mastic composition comprising asbestos, and from 30% to 60% based on said asbestos of hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said hydrocarbon resin polymer having a melting point in excess of 60° C.

3. A mastic composition comprising fibrous material, and from 30% to 60% based on said fibrous material of heat resin polymer produced by the application of heat to a hydrocarbon oil which has been physically separated from tar produced in the vapor phase pyrolysis of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said heat resin polymer having a melting point in excess of 60° C.

4. A mastic composition comprising asbestos, and from 30% to 60% based on said asbestos of heat resin polymer produced by the application of heat to a hydrocarbon oil which has been physically separated from tar produced in the vapor phase pyrolysis of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350 C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., said heat resin polymer having a melting point in excess of 60° C.

FRANK J. SODAY.